(12) United States Patent
Nam et al.

(10) Patent No.: US 12,513,658 B2
(45) Date of Patent: Dec. 30, 2025

(54) ELECTRONIC DEVICE AND METHOD FOR DETERMINING A LOCATION OF A DEVICE

(71) Applicant: SAMSUNG ELECTRONICS CO., LTD., Suwon-si (KR)

(72) Inventors: Yongsik Nam, Suwon-si (KR); Jaekwang Sim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 286 days.

(21) Appl. No.: 18/119,622

(22) Filed: Mar. 9, 2023

(65) Prior Publication Data

US 2023/0217409 A1 Jul. 6, 2023

Related U.S. Application Data

(63) Continuation of application No. PCT/KR2022/011059, filed on Jul. 27, 2022.

(30) Foreign Application Priority Data

Oct. 8, 2021 (KR) .................. 10-2021-0134158

(51) Int. Cl.
*H04W 64/00* (2009.01)
*H04B 17/318* (2015.01)
(Continued)

(52) U.S. Cl.
CPC ........ *H04W 64/006* (2013.01); *H04B 17/318* (2015.01); *H04W 4/023* (2013.01); *H04W 4/80* (2018.02)

(58) Field of Classification Search
CPC ..... H04W 64/006; H04W 4/023; H04W 4/80; H04W 64/00; G01S 5/00; G01S 5/02; G01S 11/06
See application file for complete search history.

(56) References Cited

U.S. PATENT DOCUMENTS 7,738,881 B2 6/2010 Krumm et al.
8,055,197 B2 11/2011 Lyu et al.
(Continued)

FOREIGN PATENT DOCUMENTS

JP 2005-043354 A 2/2005
JP 6507997 B2 5/2019
(Continued)

OTHER PUBLICATIONS

International Search Report (PCT/ISA/210) issued from the International Searching Authority on Nov. 8, 2022 to International Application No. PCT/KR2022/011059.
(Continued)

*Primary Examiner* — Nabil H Syed
(74) *Attorney, Agent, or Firm* — Sughrue Mion, PLLC

(57) ABSTRACT

An electronic device includes: a communication circuit; a memory storing one or more instructions; and at least one processor electrically connected with the communication circuit, and configured to execute the one or more instructions to: control the communication circuit to transmit a first short-range wireless communication signal having a first output intensity; and control the communication circuit to transmit a second short-range wireless communication signal having a second output intensity that is different from the first output intensity.

5 Claims, 8 Drawing Sheets

(51) Int. Cl.
  *H04W 4/02*    (2018.01)
  *H04W 4/80*    (2018.01)

(56) References Cited

U.S. PATENT DOCUMENTS

| | | | |
|---|---|---|---|
| 8,849,306 | B1 | 9/2014 | McMullen et al. |
| 9,264,847 | B2 | 2/2016 | Choi et al. |
| 9,591,570 | B2 | 3/2017 | Kubo et al. |
| 9,686,643 | B2 | 6/2017 | Viswanadham |
| 9,706,357 | B2 | 7/2017 | Heo et al. |
| 10,921,438 | B2 | 2/2021 | Jeon et al. |
| 2009/0251313 | A1* | 10/2009 | Perkins ............ H04W 24/10 340/539.13 |
| 2013/0078912 | A1 | 3/2013 | San Vicente et al. |
| 2014/0136411 | A1 | 5/2014 | Cho et al. |
| 2016/0262105 | A1 | 9/2016 | Tomisawa |
| 2017/0187828 | A1 | 6/2017 | Soji et al. |
| 2018/0234797 | A1 | 8/2018 | Ledvina et al. |
| 2020/0169832 | A1* | 5/2020 | Kwon ............ H04W 4/80 |
| 2021/0153294 | A1 | 5/2021 | Seo et al. |
| 2022/0070621 | A1* | 3/2022 | Thind ............ H04W 4/80 |
| 2023/0152415 | A1 | 5/2023 | Yu et al. |

FOREIGN PATENT DOCUMENTS

| | | | |
|---|---|---|---|
| JP | 6770441 | B2 | 10/2020 |
| KR | 10-2008-0056525 | A | 6/2008 |
| KR | 10-1305293 | B1 | 9/2013 |
| KR | 10-2014-0130952 | A | 11/2014 |
| KR | 10-1655758 | B1 | 9/2016 |
| KR | 10-2017-0105827 | A | 9/2017 |
| KR | 10-1780592 | B1 | 9/2017 |
| KR | 10-1852667 | B1 | 4/2018 |
| KR | 10-1879627 | B1 | 7/2018 |
| KR | 10-2069863 | B1 | 1/2020 |
| KR | 10-2239090 | B1 | 4/2021 |
| KR | 10-2275265 | B1 | 7/2021 |
| KR | 10-2022-0102036 | A | 7/2022 |

OTHER PUBLICATIONS

Written Opinion (PCT/ISA/237) issued from the International Searching Authority on Nov. 8, 2022 to International Application No. PCT/KR2022/011059.

Communication issued on Feb. 22, 2024 by the European Patent Office for European Patent Application No. 22878689.3.

Communication issued Dec. 11, 2024 by the European Patent Office for European Patent Application No. 22878689.3.

Communication issued May 23, 2024 by the European Patent Office in European Patent Application No. 22878689.3.

* cited by examiner

ELECTRONIC DEVICE AND METHOD FOR DETERMINING A LOCATION OF A DEVICE

CROSS-REFERENCE TO RELATED APPLICATION(S)

This application is a bypass continuation of International Application No. PCT/KR2022/011059 designating the United States, filed on Jul. 27, 2022, in the Korean Intellectual Property Receiving Office and claims priority from Korean Patent Application No. KR 10-2021-0134158, filed on Oct. 8, 2021, the disclosures of which are incorporated by reference herein in their entireties.

BACKGROUND

1. Field

The disclosure relates to an electronic device for determining a location and an operating method thereof.

2. Description of Related Art

Various electronic devices including wearable devices (for example, a smart watch, an earphone, a wireless speaker, a wireless headset, a smart tag), mobile communication terminals, personal digital assistants (PDAs), electronic schedulers, smartphones, tablets, personal computers (PCs), have become widely distributed. Such an electronic device may receive data from a source device through a wireless communication connection with the source device.

Regarding the above-described wireless communication connection technology, Bluetooth® standards define a protocol for short-range wireless communication between electronic devices. In a Bluetooth® network environment, electronic devices may transmit or receive data packets including contents such as texts, voices, images, or videos in a designated frequency band. For example, a user terminal or a user equipment (UE) may transmit data packets to another user terminal or an accessory device. The user terminal may be a smartphone, a tablet, a desktop computer, a laptop computer or the like.

Such an electronic device may be lost for various reasons such as user's carelessness, and a manufacturer or a service provider may provide a service for determining a location of the electronic device in case the electronic device is lost. In addition, tag products are being released for determining a position of an important article or positions of products that are always carried, but the tag products are easy to lose.

SUMMARY

According to a location determining service for an electronic device, when an electronic device, which is a location determining target device, broadcasts a signal including identification information in order to inform of its existence, neighboring electronic devices may scan the signal and may register at a predetermined server along with positioning information, and the predetermined server may share the positioning information with a host terminal that is registered with the same account as that of the electronic device.

In the related art, a host terminal displays a location of a related electronic device by using location information of a neighboring device. For example, the host terminal may determine location information of the neighboring device as a location of the related electronic device when the neighboring device satisfies a specific condition (for example, a condition where a signal of higher than a received signal strength indicator (RSSI) value is received, a condition where a signal including packets of more than a designated number of packet channels is received), and may upload into a server, and may display the location of corresponding data as the location of the device. In this method, however, when the location of the related electronic device is updated, a location error of tens of meters may occur.

Various embodiments of the disclosure provide an electronic device for providing a location determining service and an operating method thereof.

In addition, various embodiments of the disclosure provide an electronic device which may reduce an error occurring when determining a location, by changing an output intensity of a signal, without outputting the signal with a single intensity, in transmitting a signal for determining the location of the electronic device, and an operating method thereof.

According to an aspect of the disclosure, an electronic device includes: a communication circuit; a memory storing one or more instructions; and at least one processor electrically connected with the communication circuit, and configured to execute the one or more instructions to: control the communication circuit to transmit a first short-range wireless communication signal having a first output intensity; and control the communication circuit to transmit a second short-range wireless communication signal having a second output intensity that is different from the first output intensity.

The first short-range wireless communication signal may include first output information regarding the first output intensity of the first short-range wireless communication signal, and the second short-range wireless communication signal may include second output information regarding the second output intensity of the second short-range wireless communication signal.

When a battery state of the electronic device is less than or equal to a threshold value, the second output intensity may be larger than the first output intensity, and when the battery state of the electronic device is larger than the threshold value, the second output intensity may be smaller than the first output intensity.

The at least one processor may be further configured to: identify a wireless communication link state between the electronic device and another electronic device; and control the communication circuit to transmit the first short-range wireless communication signal and the second short-range wireless communication signal, based on the wireless communication link state.

When the wireless communication link state is a connection state, the second output intensity may be smaller than the first output intensity.

The at least one processor may be further configured to identify an elapsed time from a time when a wireless communication link between the electronic device and the other electronic device is disconnected, and when the elapsed time is longer than or equal to a reference time, the second output intensity may be larger than the first output intensity.

The at least one processor may be further configured to: determine a transmission period of the first short-range wireless communication signal and the second short-range wireless communication signal, based on at least one of a battery state of the electronic device or a wireless communication link state between the electronic device and another electronic device; and control the communication circuit to transmit the first short-range wireless communication signal and the second short-range wireless communication signal based on the transmission period.

The at least one processor may be further configured to: based on the battery state being less than or equal to a threshold value, determine the transmission period to be smaller than a reference value; and based on the battery state being greater than the threshold value, determine the transmission period to be larger than the reference value.

The at least one processor may be further configured to: based on the wireless communication link state being a connection state, determine the transmission period to be larger than a reference value; and based on the wireless communication link state being a disconnection state, determine the transmission period to be smaller than the reference value.

The at least one processor may be further configured to periodically generate identification information of the electronic device including a first identification information and a second identification information, the first short-range wireless communication signal may include the first identification information generated at a first time, and the second short-range wireless communication signal may include the second identification information generated at a second time, and the identification information of the electronic device may include at least one of a Bluetooth address of the electronic device, a device identifier, and information regarding a history of connecting with another electronic device.

According to an aspect of the disclosure, an electronic device includes: a communication circuit; a memory storing one or more instructions; and at least one processor electrically connected with the communication circuit and configured to execute the one or more instructions to: receive, via the communication circuit, a first short-range wireless communication signal including first output information from another electronic device; receive, via the communication circuit, a second short-range wireless communication signal including second output information from the other electronic device; select a signal having a smaller intensity from among of the first short-range wireless communication signal having a first output intensity and the second short-range wireless communication signal having a second output intensity; generate a location information signal including output information included in the selected signal, and location information of the electronic device; and control the communication circuit to transmit the location information signal to a server, wherein the first output information includes information regarding the first output intensity of the first short-range wireless communication signal, and the second output information includes information regarding the second output intensity of the second short-range wireless communication signal.

The at least one processor may be further configured to: receive, from the server, a measurement request signal instructing to measure a distance from the electronic device to the other electronic device; based on the received measurement request signal, generate a distance measurement result by measuring the distance from the electronic device to the other electronic device; and control the communication circuit to transmit the generated distance measurement result to the server.

The at least one processor may be further configured to: identify a first RSSI value of the first short-range wireless communication signal; and based on identifying that a difference between the first RSSI value and the first output intensity of the first short-range wireless communication signal is less than or equal to a reference value, select the first short-range wireless communication signal.

The location information of the electronic device may include at least one of global positioning system (GPS) information of the electronic device, or information regarding a relative location of the electronic device with respect to the other electronic device.

The electronic device may further include a display configured to display a user interface indicating that the location information signal including the location information is transmitted to the server.

According to an aspect of the disclosure, a method of operating an electronic device includes: transmitting a first short-range wireless communication signal having a first output intensity; and transmitting a second short-range wireless communication signal having a second output intensity that is different from the first output intensity.

The first short-range wireless communication signal may include first output information regarding the first output intensity of the first short-range wireless communication signal, and the second short-range wireless communication signal may include second output information regarding the second output intensity of the second short-range wireless communication signal.

When a battery state of the electronic device is less than or equal to a threshold value, the second output intensity may be larger than the first output intensity, and when the battery state of the electronic device is larger than the threshold value, the second output intensity may be smaller than the first output intensity.

The method may further include: identifying a wireless communication link state between the electronic device and another electronic device, wherein, when the identified wireless communication link state is a connection state, the second output intensity is smaller than the first output intensity, and when the identified wireless communication link state is a disconnection state, identifying an elapsed time from a time when a wireless communication link between the electronic device and the other electronic device is disconnected, wherein, when the elapsed time is longer than or equal to a reference time, the second output intensity is larger than the first output intensity.

The method may further include periodically generating identification information of the electronic device including a first identification information and a second identification information, wherein the first identification information included in the first short-range wireless communication signal is different from the second identification information included in the second short-range wireless communication signal.

According to an embodiment, when an electronic device displays its location by using location information of neighboring devices, the electronic device may include its output power in a signal received from a neighboring device, thereby providing an effect of more exactly indicating its location.

The effect achieved by the disclosure is not limited to those mentioned above, and other effects that are not mentioned above may be clearly understood to those skilled in the art based on the description provided below.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Hereinafter, various embodiments of the disclosure will be described with reference to the accompanying drawings. However, it should be appreciated that various embodiments are not intended to limit the disclosure to particular embodiments and include various modifications, equivalents, and/or alternatives of embodiments of the disclosure.

Figure 1:
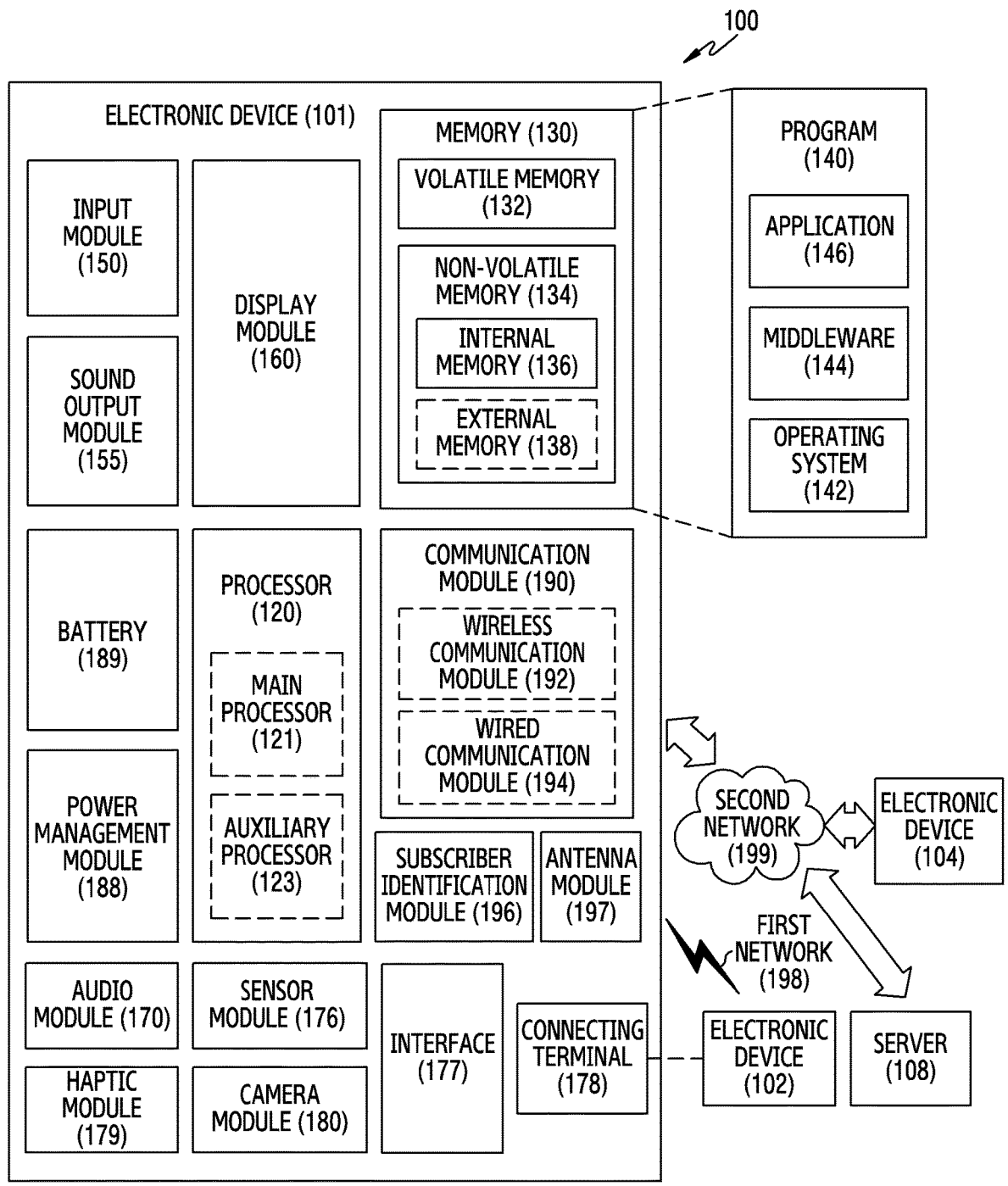
FIG. 1 is a block diagram of an electronic device in a network environment according to an embodiment.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
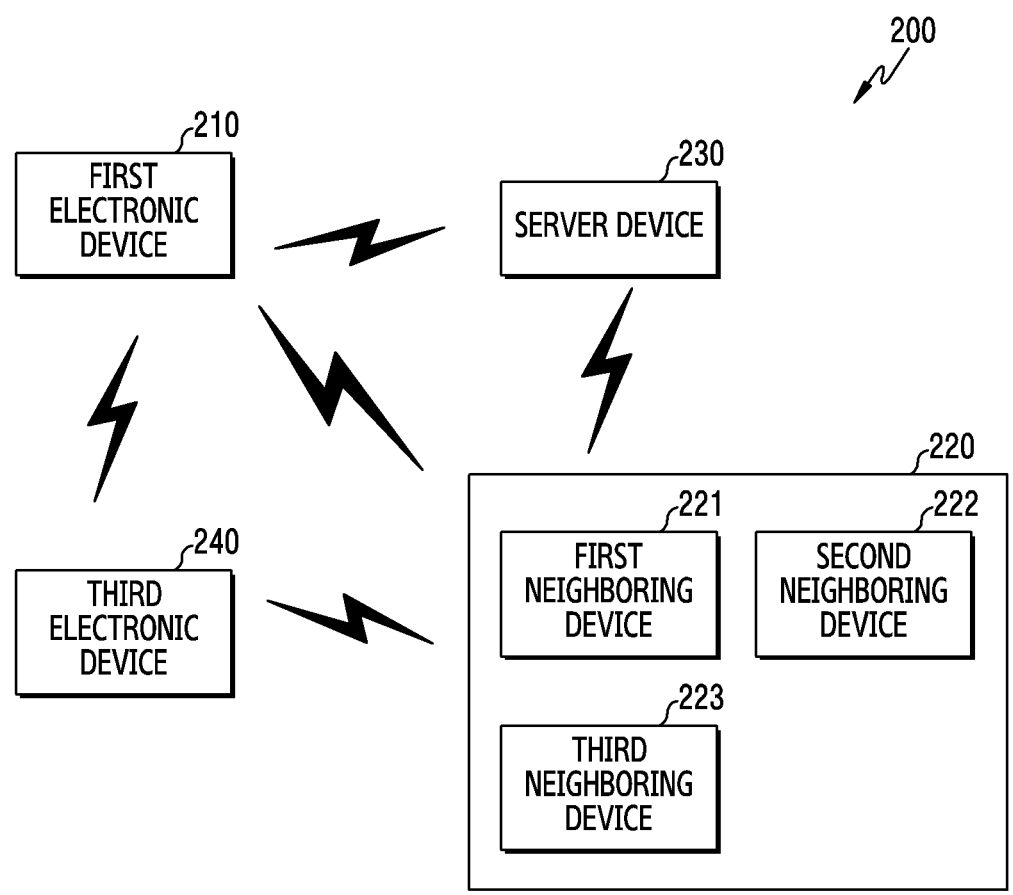
FIG. 2 is a view illustrating a location determining system of an electronic device according to an embodiment of the disclosure.

FIG. 2 illustrates a location determining system of an electronic device according to an embodiment of the disclosure.

Referring to FIG. 2, the location determining system 200 may include a first electronic device 210, a second electronic device 220, a server device 230, and a third electronic device 240. The first electronic device 210, the second electronic device 220, the server device 230, and the third electronic device 240 may be or may include an electronic device 101 illustrated in FIG. 1. However, the disclosure of the electronic device is not limited to the illustration in FIG. 1, and may include other components or arrangements without deviating from the scope of the disclosure.

In an embodiment, the first electronic device 210 may be or may include an electronic device which needs to determine a location. For example, the first electronic device 210 may be or may include a smart tag, a wearable device, and a portable terminal device.

In an embodiment, the second electronic device 200 may refer to a device that is used as an anchor for determining the location of the first electronic device 210. The second electronic device 220 may include an electronic device which is positioned in a region adjacent to the first electronic device 210. In the following descriptions, the second electronic device 220 may be referred to as a "neighboring device". According to an embodiment, the second electronic device 220 (i.e., the neighboring device 220) may include a first neighboring device 221, a second neighboring device 222, and a third neighboring device 223. In FIG. 2, only three second electronic devices (a first neighboring device 221, a second neighboring device 222, and a third neighboring device 223) are illustrated, but this is merely an example, and less than three or more than three second electronic device 220 may be provided.

In an embodiment, the server device 230 may control signaling among the first electronic device 210, the second electronic device 220, and the third electronic device 240 in order to determine the location of the first electronic device 210.

In an embodiment, the third electronic device 240 may include an electronic device that is directly carried by a user. For example, the location of the first electronic device 210 may be determined through an application related to a location determining service, which is stored in the third electronic device 240. In the following descriptions, the third electronic device 240 may be referred to as a "host-terminal." The third electronic device 240 may be an electronic device that operates as a primary device, and the first electronic device 210 may be an electronic device that operates as a secondary device.

In an embodiment, the server device 230 may transmit information regarding the location of the first electronic device 210 to the third electronic device 240. For example, the information regarding the location of the first electronic device 210 may include at least one of values related to a relative location difference of the first electronic device 210 from the second electronic device 220.

In an embodiment, the information regarding the location of the first electronic device 210 may include location information of the second electronic device 220 that is positioned in a region closest to the first electronic device. For example, when it is determined that the first neighboring device 221 is positioned closest to the first electronic device 210 among the first neighboring device 221, the second neighboring device 222, and the third neighboring device 223, the server device 230 may transmit location information of the first neighboring device 221 to the third electronic device 240 as the location information of the first electronic device 210.

In an embodiment, when the first electronic device 210 is out of a range enabling short-range communication with the third electronic device 240, a wireless communication link between the first electronic device 210 and the third electronic device 240 may be disconnected. That is, when the first electronic device 210 is distanced by a reference distance or longer, and/or when communication is not smoothly performed between the first electronic device 210 and the third electronic device 240 due to a physical object, a wireless communication link between the first electronic device 210 and the third electronic device 240 may be disconnected. According to an embodiment, the reference distance may be predetermined distance. For example, when it is identified that the third electronic device 240 does not receive a short-range communication signal, which is periodically received from the first electronic device 210, for a pre-defined time, it may be determined that the wireless communication link between the first electronic device 210 and the third electronic device 240 is disconnected. When the wireless communication link between the first electronic device 210 and the third electronic device 240 is disconnected, the third electronic device 240 may have difficulty in determining the location of the first electronic device 210 through the first electronic device 210. In this case, the first electronic device 210 may inform the third electronic device 240 of the location of the first electronic device 210 through the second electronic device 220 and the server device 230.

In an embodiment, when the second electronic device 220 receives a signal from the first electronic device 210 and the received signal satisfies a condition, a location of the second electronic device 220 may be transmitted to the server device 230. According to an embodiment, the condition may be predetermined condition. The server device 230 may receive location information of the second electronic device 220 from the second electronic device 220, and may determine the location information of the second electronic device 220 as a location of the first electronic device 210. The server device 230 may transmit information regarding the location of the first electronic device 210 that is received from the second electronic device 220 (for example, location information of the second electronic device 220) to the third electronic device 240. Through this, the third electronic device 240 may determine the location of the first electronic device 210.

In an embodiment, the server device 230 may receive respective location information of the plurality of neighboring devices from the plurality of neighboring devices (for example, the first neighboring device 221, the second neighboring device 222, and the third neighboring device 223). The server device 230 may determine location information to transmit to the third electronic device 240 among the received respective location information according to a criterion. According to an embodiment, the criterion may be predetermined criterion. According to an embodiment, the criterion may include a plurality of criteria. For example, the server device 230 may determine location information to transmit to the third electronic device 240, based on a strength of an output signal of the first electronic device which is received from the plurality of neighboring devices.

Hereinafter, examples of operations of the first electronic device 210, the second electronic device 220 (for example, the first neighboring device 221, the second neighboring device 222, the third neighboring device 223), the server device 230, and the third electronic device (for example, the host-terminal) for determining a location of the first electronic device 210 will be explained. The first electronic device 210 may include an electronic device which is a location determining target. For example, the first electronic device 210 may include a lost device.

A user may directly receive location information from the first electronic device through a terminal device that the user currently carries, in order to determine a location of the first electronic device. However, when the first electronic device is positioned at a predetermined distance or longer from the terminal, or is in an environment where it is difficult to transmit and receive signals directly, the terminal may have difficulty in directly receiving location information from the first electronic device, and accordingly, the terminal may indirectly determine the location of the first electronic device by using location information of other neighboring electronic devices. In other words, the user may receive a location of a neighboring device positioned adjacent to the first electronic device from a server, and may identify the location of the first electronic device by determining the location of the neighboring device as a location corresponding to the location of the first electronic device.

In this regard, when there are a plurality of neighboring devices in a region adjacent to the first electronic device, the user may identify a neighboring device that is positioned closest to the location of the first electronic device, and may need to receive location information of the identified neighboring device. The disclosure relates to a device for determining a location of a first electronic device by using neighboring devices, and an operating method thereof, and specifically, to a method and a system for identifying a best neighboring device that may reduce an error range of the location of the first electronic device, that is, a neighboring device existing in the closest location, and delivering location information of the identified neighboring device to a host terminal as location information of the first electronic device.

Figure 3:
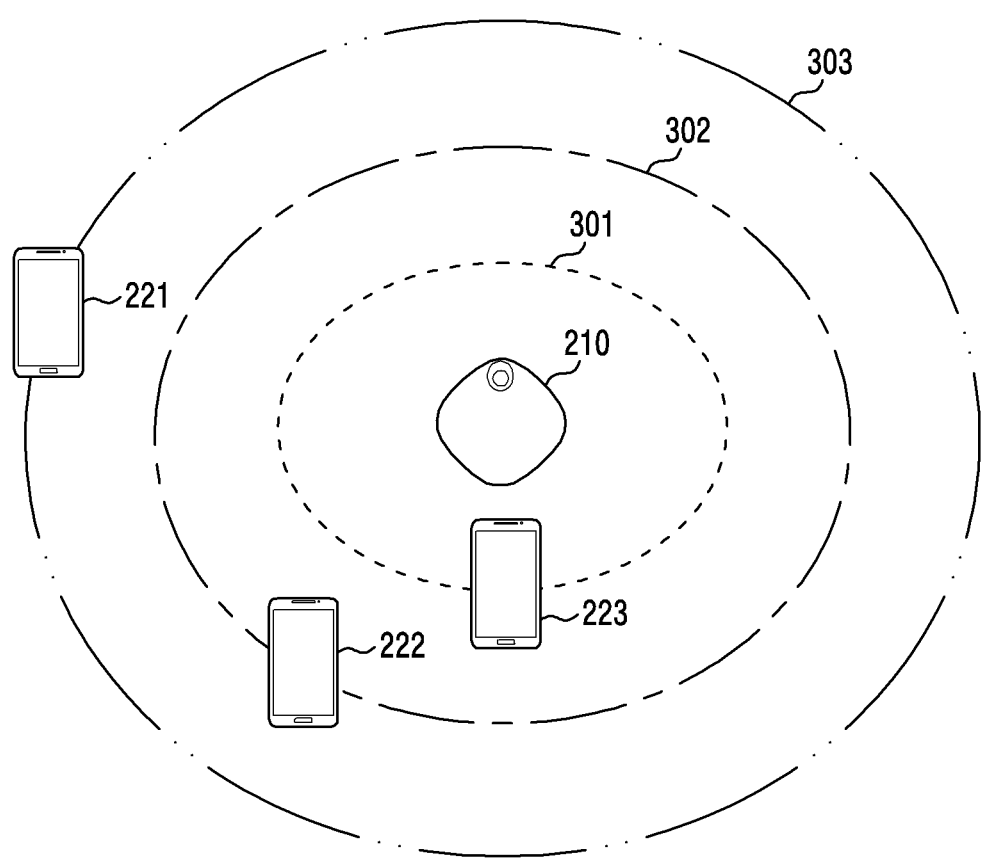
FIG. 3 is a view illustrating an example of signal transmission for determining a location of an electronic device according to an embodiment of the disclosure.

FIG. 3 illustrates an example of signal transmission for determining a location of an electronic device according to an embodiment of the disclosure.

In an embodiment, a first electronic device 210 may transmit at least one short-range communication signal to at least one neighboring device adjacent to the first electronic device 210. For example, the first electronic device 210 may broadcast at least one short-range communication signal. In the following descriptions, "broadcasting" refers to an operation of transmitting signals to a plurality of unspecific neighboring devices positioned adjacent to the first electronic device 210, and may be used as the same meaning as "advertising." The short-range communication signal may include a signal which uses Bluetooth® technology.

In an embodiment, the first electronic device 210 may transmit short-range communication signals having different output intensities by variably changing outputs, rather than transmitting the short-range communication signal through a single output. FIG. 3 illustrates that the first electronic device 210 transmits three short-range communication signals, but this is merely an example, and the first electronic device 210 may transmit more than three signals or less than three signals.

Referring to FIG. 3, the first electronic device 210 may transmit a first short-range communication signal 301 including first output information, a second short-range communication signal 302 including second output information, and a third short-range communication signal 303 including third output information. The first output information, the second output information, and the third output information may have different output values, respectively. For example, the first output information may include an output value of −10 dBm, the second output information may include an output value of 0 dBm, and the third output information may include an output value of 10 dBm.

In an embodiment, second electronic devices 220 (for example, a first neighboring device 221, a second neighboring device 222, and a third neighboring device 223) positioned in regions adjacent to the first electronic device 210 may receive the short-range communication signals transmitted from the first electronic device 210. The second electronic devices 220 may receive some or all of at least one short-range communication signal transmitted from the first electronic device 210, according to distances to the first electronic device 210 or an ambient environment. For example, referring to FIG. 3, the first neighboring device 221 which is farthest away from the first electronic device 210, among the first neighboring device 221, the second neighboring device 222, and the third neighboring device 223, may receive only the third short-range communication signal 303, the second neighboring device 222 may receive the second short-range communication signal 302 and the third short-range communication signal 303, and the third neighboring device 223 which is closest to the first electronic device 210 may receive all of the first short-range communication signal 301, the second short-range communication signal 302, and the third short-range communication signal 303.

In an embodiment, the second electronic device 220 may determine a signal to transmit to a server in relation with a location of the first electronic device 210, based on output information included in the at least one short-range communication signal received from the first electronic device 210. The second electronic device 220 (for example, the first neighboring device 221, the second neighboring device 222, the third neighboring device 223) may transmit, to the server, output information including a lowest output value among the at least one short-range communication signal received from the first electronic device 210.

For example, since the output information having the lowest output value among the pieces of output information included in the short-range communication signals that the third neighboring device 223 receives from the first electronic device 210 is the first output information (−10 dBm) included in the first short-range communication signal 301, the third neighboring device 223 may transmit the output information of −10 dBm to the server even if the third neighboring device 223 receives a signal including output information having an output value of −10 dBm or more from the first electronic device 210.

In addition, since the output information having the lowest output value among the short-range communication signals that the second neighboring device 222 receives from the first electronic device 210 is the second output information included in the second short-range communication signal 302, the second neighboring device 222 may transmit the output information of 0 dBm to the server even if the second neighboring device 222 receives a signal of 0 dBm or more from the first electronic device 210.

In another embodiment, the second electronic device 220 (for example, the first neighboring device 221, the second neighboring device 222, the third neighboring device 223) may transmit, to the server, information regarding a received signal strength of the at least one short-range communication signal received from the first electronic device 210. For example, the second electronic device 220 may transmit, to the server, information regarding a received signal strength of a received short-range communication signal. In another example, when a strength of a short-range communication signal received by the second electronic device 220 satisfies a condition, the second electronic device 220 may transmit information regarding the received signal strength to the server. According to an embodiment, the condition may be met based on a difference between a strength information included in the output information for the output signal and an actual strength of the received output signal. For example, the condition may be met when a difference between a strength information included in the output information for the output signal and an actual strength of the received output signal is less than a designated value.

In an embodiment, a server device 230 may determine location information to transmit to a third electronic device 240, based on respective output information included in signals received from at least one neighboring device.

In an embodiment, the server device 230 may determine, as location information to transmit to the third electronic device 240, location information of a neighboring device that transmits output information having the lowest output value among at least one piece of output information received from at least one neighboring device.

For example, referring to FIG. 3, the server device 230 may receive the first output information (10 dBm) from the first neighboring device 221, may receive the second output information (0 dBm) from the second neighboring device 222, and may receive the third output information (−10 dBm) from the third neighboring device 223. Since the output information that has the lowest output value among the pieces of output information that the server device 230 receives is the third output information (−10 dBm), and the neighboring device that transmits the same is the third neighboring device 223, the server device 230 may determine that the third neighboring device 223 is closest to the first electronic device 210, and may transmit location information of the third neighboring device 223 to the third electronic device 240.

As described above, the server device 230 may use the output information received from the neighboring devices, in order to identify a neighboring device that is positioned closest among the plurality of neighboring devices positioned adjacent to the first electronic device 210. The first electronic device may change outputs and may transmit short-range communication signals having various output values, rather than transmitting the short-range communication signal through a single output, such that the neighboring devices transmit different output information to the server.

Figure 4:
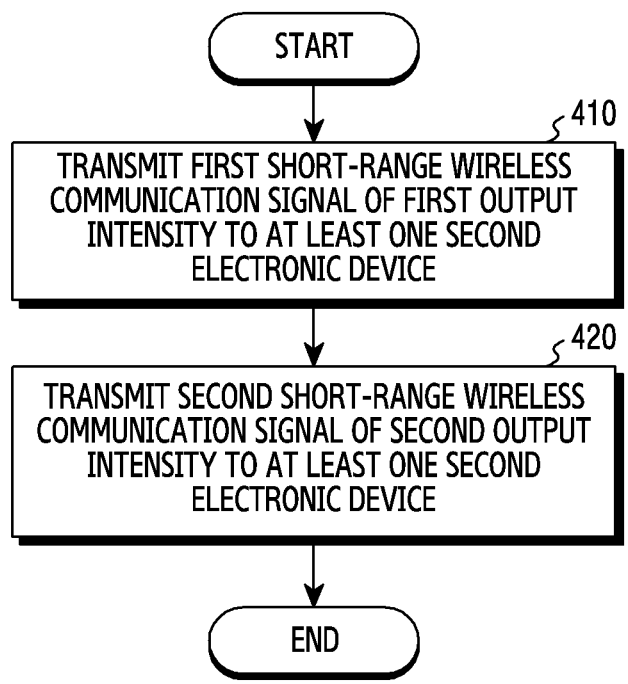
FIG. 4 is a view illustrating an operation flow of a first electronic device according to an embodiment of the disclosure.

FIG. 4 illustrates an operation flow of a first electronic device according to an embodiment of the disclosure. The first electronic device of FIG. 4 may be a device that corresponds to the first electronic device 210. A second electronic device of FIG. 2 may be a device that corresponds to the second electronic device 220 (for example, the first neighboring device 221, the second neighboring device 222, the third neighboring device 223). A third electronic device of FIG. 4 may be a device that corresponds to the third electronic device 240.

According to an embodiment, in operation 410, the first electronic device may transmit a first short-range wireless communication signal of a first output intensity to at least one second electronic device. In an embodiment, the first electronic device may transmit a first short-range wireless communication signal including first output information. For example, the first electronic device may transmit a broadcasting packet by using an advertisement signal of Bluetooth® (BT) or Bluetooth® low energy (BLE). The first electronic device may include a device that is lost by a user. The first electronic device may inform a user of a location of the first electronic device by transmitting a signal for informing adjacent neighboring electronic device of its location.

In an embodiment, the first output information may include information regarding an output intensity of the first short-range wireless communication signal. The output intensity of the first short-range wireless communication signal may correspond to an output value of the first short-range wireless communication signal. For example, when the first electronic device transmits the first short-range wireless communication signal with a value of 10 dBm, the first output information may include the value of 10 dBm as an output intensity. A neighboring device which receives the first short-range wireless communication signal may identify the output intensity of the first short-range wireless communication signal through the first output information included in the first short-range wireless communication signal.

According to an embodiment, in operation 420, the first electronic device may transmit a second short-range wireless communication signal of a second output intensity to at least one second electronic device.

In an embodiment, the first electronic device may transmit a second short-range wireless communication signal including second output information. The second output information may include information regarding an output intensity of the second short-range wireless communication signal. The output intensity of the second short-range wireless communication signal may correspond to an output value of the second short-range wireless communication signal.

In an embodiment, the output intensity of the second short-range wireless communication signal may be different from the output intensity of the first short-range wireless communication signal. For example, the first electronic device may transmit the second short-range wireless communication signal with a different output intensity from that of the first short-range wireless communication signal. The first electronic device may transmit a short-range wireless communication signal (for example, the first short-range wireless communication signal, the second short-range wireless communication signal) while changing an output value, rather than transmitting the short-range wireless communication signal through a single output, such that the output value is considered in determining a location of the first electronic device and an effect of reducing an error in the location is provided.

In an embodiment, the first electronic device may transmit the first short-range wireless communication signal and the second short-range wireless communication signal, based on a battery state of the first electronic device. For example, when the battery state of the first electronic device is less than or equal to a threshold value, the first electronic device may transmit the second short-range wireless communication signal through an output intensity that is greater than the output intensity of the first short-range wireless communication signal. For example, when the battery state of the first electronic device exceeds the threshold value, the first electronic device may transmit the second short-range wireless communication signal through an output intensity that is smaller than the output intensity of the first short-range wireless communication signal. According to an embodiment, the battery state may refer to a battery level or an amount of charge remaining in the battery.

In an example, the first electronic device may transmit the first short-range wireless communication signal and the second short-range wireless communication signal, based on information regarding a state of a wireless communication link (hereinafter, referred to as a wireless communication link) with the third electronic device. The information regarding the wireless communication link state may include information regarding whether the wireless communication link is currently formed, information regarding an elapsed time from a time when the wireless communication link is disconnected if the wireless communication link is disconnected. When the wireless communication link is formed, the first electronic device may be determined to be positioned in a region relatively closer to the third electronic device than when the wireless communication link is disconnected.

In an embodiment, when it is identified that the wireless communication link is formed, the first electronic device may transmit the second short-range wireless communication signal through an output intensity that is the same as or smaller than the output intensity of the first short-range wireless communication signal.

In an embodiment, when it is identified that the wireless communication link is disconnected, the first electronic device may transmit the first short-range wireless communication signal and the second short-range wireless communication signal, based on an elapsed time from the time when the wireless communication link is disconnected. The first electronic device may transmit a short-range wireless communication signal having a stronger output intensity as a longer time is elapsed from the time when the wireless communication link is disconnected.

In an embodiment, when a first time is not elapsed from the time when the wireless communication link is disconnected, the first electronic device may transmit the first short-range wireless communication signal and the second short-range wireless communication signal, through an output intensity that is lower than or equal to a pre-defined output intensity. For example, when the first time is not elapsed from the time when the wireless communication link with the third electronic device is disconnected, the first electronic device may transmit the first short-range wireless communication signal and the second short-range wireless communication signal, through an output intensity that is lower than or equal to the pre-defined output intensity (for example, 0 dBm). In addition, when the first time is elapsed from the time when the first electronic device transmits the first short-range wireless communication signal through the output intensity less than or equal to the pre-defined output intensity, the first electronic device may transmit the second short-range wireless communication signal through an output intensity greater than the pre-defined output intensity.

In an embodiment, the first electronic device may transmit the first short-range wireless communication signal and the second short-range wireless communication signal according to a period. The period may be a pre-set value or a value that is adaptively determined according to a state of the first electronic device and a wireless communication link forming state. For example, when the battery state of the first electronic device is less than or equal to a threshold value, the first electronic device may transmit the first short-range wireless communication signal and the second short-range wireless communication signal according to a period shorter than a pre-set period. In addition, for example, when a time exceeding a designated time is elapsed from a time when the wireless communication link is disconnected, the first electronic device may transmit the first short-range wireless communication signal and the second short-range wireless communication signal according to a period shorter than the pre-set period.

In an embodiment, the first electronic device may transmit the first short-range wireless communication signal and the second short-range wireless communication signal in response to a short-range wireless communication signal transmission request (hereinafter, a second request signal) being received from a server device. The server device may transmit the second request signal to the first electronic device in response to a signal (for example, a first request signal) for requesting transmission of the second request signal being received from the third electronic device. The third electronic device may transmit the first request signal to the server device in response to a user input related to determination of a location of the first electronic device being identified (for example, a user input received through a user interface related to determination of a location being identified). In this case, when a wireless communication link is formed between the third electronic device and the first electronic device, the third electronic device may directly transmit the short-range wireless communication signal transmission request to the first electronic device without transmitting the first request signal to the server device.

In an embodiment, the short-range wireless communication signal (for example, the first short-range wireless communication signal, the second short-range wireless communication signal) may include a signal that is transmitted based on Bluetooth® or Bluetooth® low energy (BLE). The short-range wireless communication signal (for example, the first short-range wireless communication signal, the second short-range wireless communication signal) may include at least one BLE packet.

In an embodiment, the BLE packet may include identification information of the first electronic device (for example, a Bluetooth® ID, a Bluetooth® address, an identifier of the first electronic device), device information (for example, a battery state, information related to a paired host-terminal), output information and/or server information (for example, address information of a server at which the first electronic device and the third electronic device are registered).

In an embodiment, identification information of the first electronic device included in the first short-range wireless communication signal, and identification information of the first electronic device included in the second short-range wireless communication signal may be different. The first electronic device may periodically update and encrypt identification information included in the BLE packet of the short-range wireless communication signal to transmit.

Figure 5:
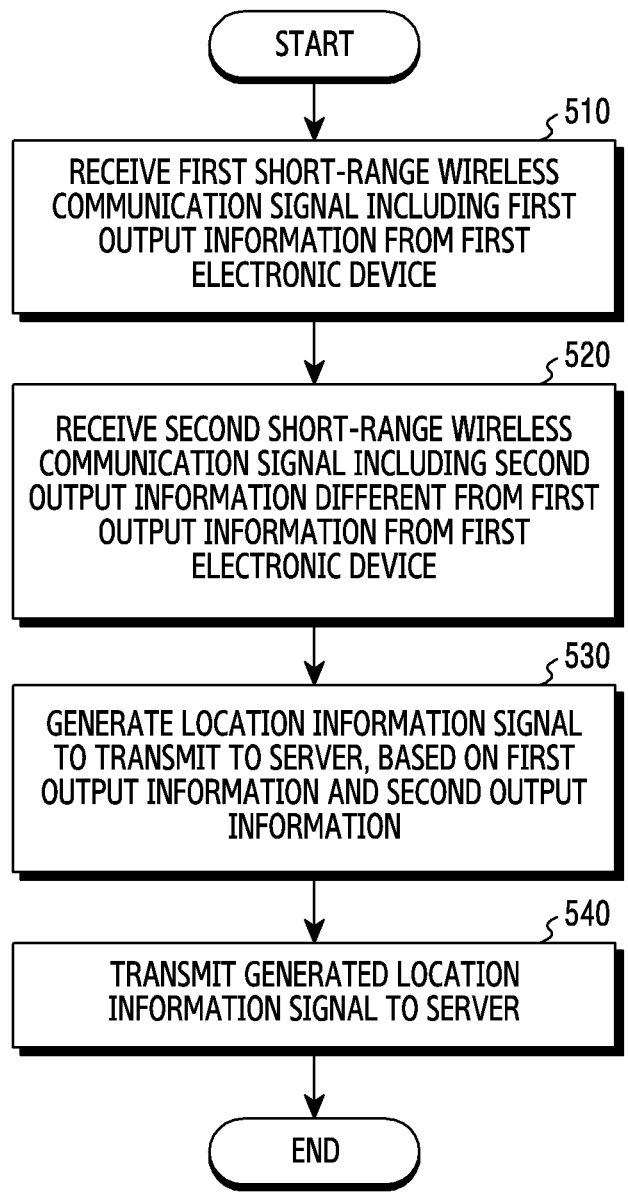
FIG. 5 is a view illustrating an operation flow of a second electronic device according to an embodiment of the disclosure.

FIG. 5 illustrates an operation flow of a second electronic device according to an embodiment of the disclosure. The second electronic device of FIG. 5 may be a device that corresponds to the second electronic device 220 (for example, the first neighboring device 221, the second neighboring device 222, the third neighboring device 223). A first electronic device of FIG. 5 may be a device that corresponds to the first electronic device 210. A third electronic device of FIG. 5 may be a device that corresponds to the third electronic device 240. In explaining operations of the second electronic device of FIG. 5, redundant explanations of the same contents as described in FIGS. 2 to 4 may be omitted.

Referring to FIG. 5, an operation flow of the second electronic device (neighboring device) which is used as a node to inform of a position of a first electronic device is illustrated. The second electronic device may receive a signal from the first electronic device, and may transmit location information of the second electronic device to a server device based on the received signal, in order to inform a third electronic device (host-terminal) of a location of the first electronic device. There may not be only one second electronic device and a plurality of second electronic devices may be positioned in a region adjacent to the first electronic device.

According to an embodiment, in operation 510, the second electronic device may receive a first short-range wireless communication signal including first output information from the first electronic device. According to an embodiment, in operation 520, the second electronic device may receive a second short-range wireless communication signal including second output information from the first electronic device. The second electronic device may receive a short-range wireless communication signal transmitted from the first electronic device in order to inform a server of information related to a location of the first electronic device.

In an embodiment, the first output information may include information regarding an output intensity of the first short-range wireless communication signal. The second output information may include information regarding an output intensity of the second short-range wireless communication signal. The output intensity of the second short-range wireless communication signal may be different from the output intensity of the first short-range wireless communication signal.

In an embodiment, the short-range wireless communication signal (for example, the first short-range wireless communication signal, the second short-range wireless communication signal) may include a signal which is transmitted based on BLE technology.

According to an embodiment, in operation 530, the second electronic device may generate a location information signal to transmit to a server, based on the first output information and the second output information.

In an embodiment, the second electronic device may identify output information including a smaller output value among a first output value included in the first output information and a second output value included in the second output information. For example, when the first output information has 10 dBm as an output value and the second output information has -10 dBm as an output value, the second electronic device may identify that the second output information is output information including a smaller output value. The identified output information may be included in the location information signal that the second electronic device will transmit to the server.

In an embodiment, the location information signal may include the identified output information and location information of the second electronic device. For example, when the first output information has 10 dBm as an output value and the second output information has -10 dBm as an output value, the second electronic device may generate a location information signal including the second output information. For example, the location information of the second electronic device may include information (for example, a global positioning system (GPS)) regarding a current location of the second electronic device. In addition, for example, the location information of the second electronic device may include information (for example, ultra wideband (UWB) ranging information) regarding a location difference from the first electronic device. In addition, for example, the information regarding the location difference from the first electronic device may be generated based on a ranging preamble included in BLE packets included in the short-range wireless communication signal received from the first electronic device.

According to an embodiment, in operation 540, the second electronic device may transmit the generated location information signal to the server.

In an embodiment, the second electronic device may transmit the location information signal to the server, based on a received signal strength (for example, a received signal strength indicator (RSSI) value) of the first short-range wireless communication signal received from the first electronic device. For example, when a difference between the RSSI value of the first short-range wireless communication signal received by the second electronic device, and a first output value included in the first output information is less than or equal to a pre-defined value, the second electronic device may transmit the location information signal of the second electronic device to the server device, regardless of whether the second short-range wireless communication signal is received. When a difference between a strength of a really outputted signal and a strength of a received signal is not great, it may be determined that the first electronic device and the corresponding second electronic device are positioned close to each other enough, and accordingly, the second electronic device may transmit the location information to the server based on the corresponding signal, without having to receive a plurality of short-range wireless communication signals from the first electronic device.

In an example, when the second electronic device transmits the location information signal to the server, a user interface including information indicating that the second electronic device has transmitted the location information signal to the server may be displayed through a display of the second electronic device.

Figure 6:
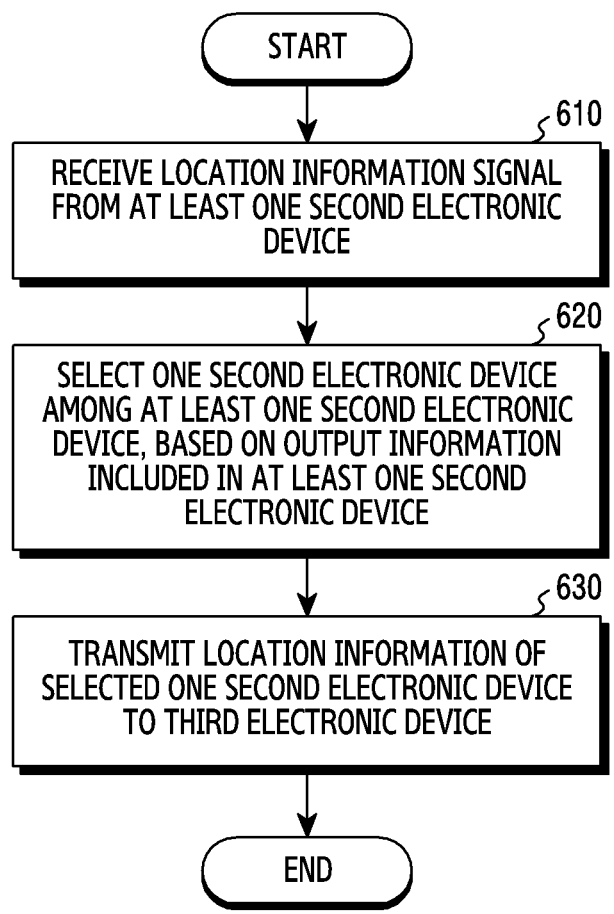
FIG. 6 is a view illustrating an operation flow of a server device according to an embodiment of the disclosure.

FIG. 6 illustrates an operation flow of a server device according to an embodiment of the disclosure. The server device of FIG. 6 may include the server device 230. A first electronic device of FIG. 6 may be a device corresponding to the first electronic device 210. A second electronic device of FIG. 6 may be a device corresponding to the second electronic device 220 (for example, the first neighboring device 221, the second neighboring device 222, the third neighboring device 223). A third electronic device of FIG. 6 may be a device corresponding to the third electronic device 240. In explaining operations of the server device of FIG. 6, redundant explanations of the same contents as described in FIGS. 2 to 5 may be omitted. The server device explained in FIG. 6 may include a device that transmits and receives signals between the second electronic device and the third electronic device in order to inform the third electronic device of a location of the first electronic device. The server device of FIG. 6 may include a server device that manages a location determining application executed in the third electronic device.

According to an embodiment, in operation 610, the server device may receive a location information signal from at least one second electronic device.

In an embodiment, the signal received from the at least one second electronic device may include output information to the at least one second electronic device, and location information. The server device may receive a first location information signal from the first neighboring device 221, may receive a second location information signal from the second neighboring device 222, and may receive a third location information signal from the third neighboring device 223. The first location information signal may include output information and location information of the first neighboring device 221, the second location information signal may include output information and location information of the second neighboring device 222, and the third location information signal may include output information and location information of the third neighboring device 223.

In an embodiment, the location information signal received from the at least one second electronic device may include respective output information and location information of the at least one second electronic device. The respective output information of the at least one second electronic device may include output information of a short-range wireless communication signal corresponding to the smallest output value among short-range wireless communication signals that the at least one second electric device receives from the first electronic device. For example, when an output value of a first short-range wireless communication signal that the first neighboring device 221 receives from the first electronic device is 10 dBm, and an output value of a second short-range wireless communication signal is 20 dBm, the output information of the first neighboring device 221 may include first output information (10 dBm) which is the output information of the first short-range wireless communication signal.

According to an embodiment, in operation 620, the server device may select one second electronic device from the at least one second electronic device, based on the output information included in the at least one second electronic device.

In an embodiment, the server device may select a second electronic device corresponding to output information including the smallest output value among the pieces of output information of the at least one second electronic device. For example, when the output value of the output information included in the first location information signal received from the first neighboring device 221 is 10 dBm, the output value of the output information included in the second location information signal received from the second neighboring device 222 is 0 dBm, and the output value of the output information included in the third location information received from the third neighboring device 223 is -10 dBm, the server device may select the third neighboring device 223 as a second electronic device corresponding to the output information including the smallest output value (−10 dBm).

According to an embodiment, in operation 630, the server device may transmit location information of the selected one second electronic device to the third electronic device.

For example, when the third neighboring device 223 is selected, the server device may transmit location information (for example, GPS information, UWB-based ranging value) of the third neighboring device 223 to the third electronic device.

In an embodiment, the server device may transmit location information of another second electronic device transmitting location information to the third electronic device, along with the location information of the selected one second electronic device. Through this, the third electronic device may identify the location of the first electronic device, based on location information of the plurality of second electronic devices.

Figure 7:
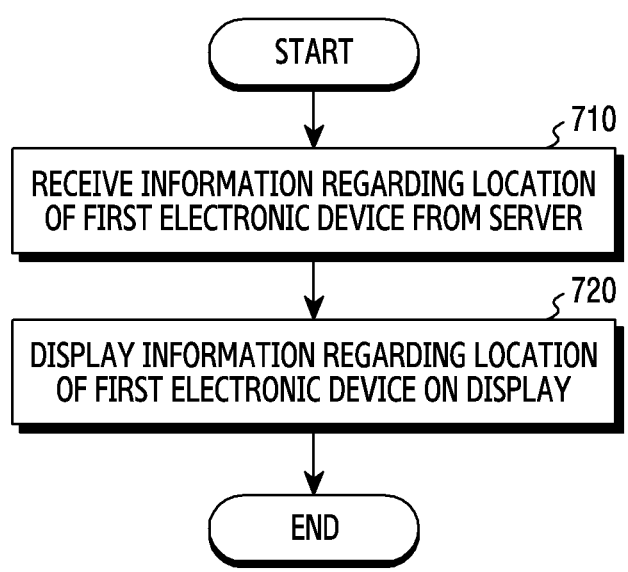
FIG. 7 is a view illustrating an operation flow of a third electronic device according to an embodiment of the disclosure.

FIG. 7 illustrates an operation flow of a third electronic device according to an embodiment of the disclosure. The third electronic device of FIG. 7 may be a device corresponding to the third electronic device 240, the electronic device 101. A server device of FIG. 7 may include the server device 230. A first electronic device of FIG. 7 may be a device corresponding to the first electronic device 210. A second electronic device of FIG. 7 may be a device corresponding to the second electronic device 220 (for example, the first neighboring device 221, the second neighboring device 222, the third neighboring device 223). In explaining operations of the third electronic device of FIG. 7, redundant explanations of the same contents as described in FIGS. 2 to 6 may be omitted. The third electronic device described in FIG. 7 may include a device regarding a host-terminal which is currently carried by a user.

According to an embodiment, the third electronic device may receive information regarding a location of the first electronic device from the server device.

According to an embodiment, the third electronic device may display the received information regarding the location of the first electronic device through a display.

In an embodiment, the third electronic device may form a wireless communication link with the first electronic device, based on Bluetooth® technology, although this is not illustrated in the drawing.

In an embodiment, the third electronic device may transmit identification information of the third electronic device to the server although this is not illustrated in the drawing.

In an embodiment, the third electronic device may display a user interface for determining a location through the display although this is not illustrated. The third electronic device may identify a user input for determining a location, through the user interface for determining the location.

Figure 8:
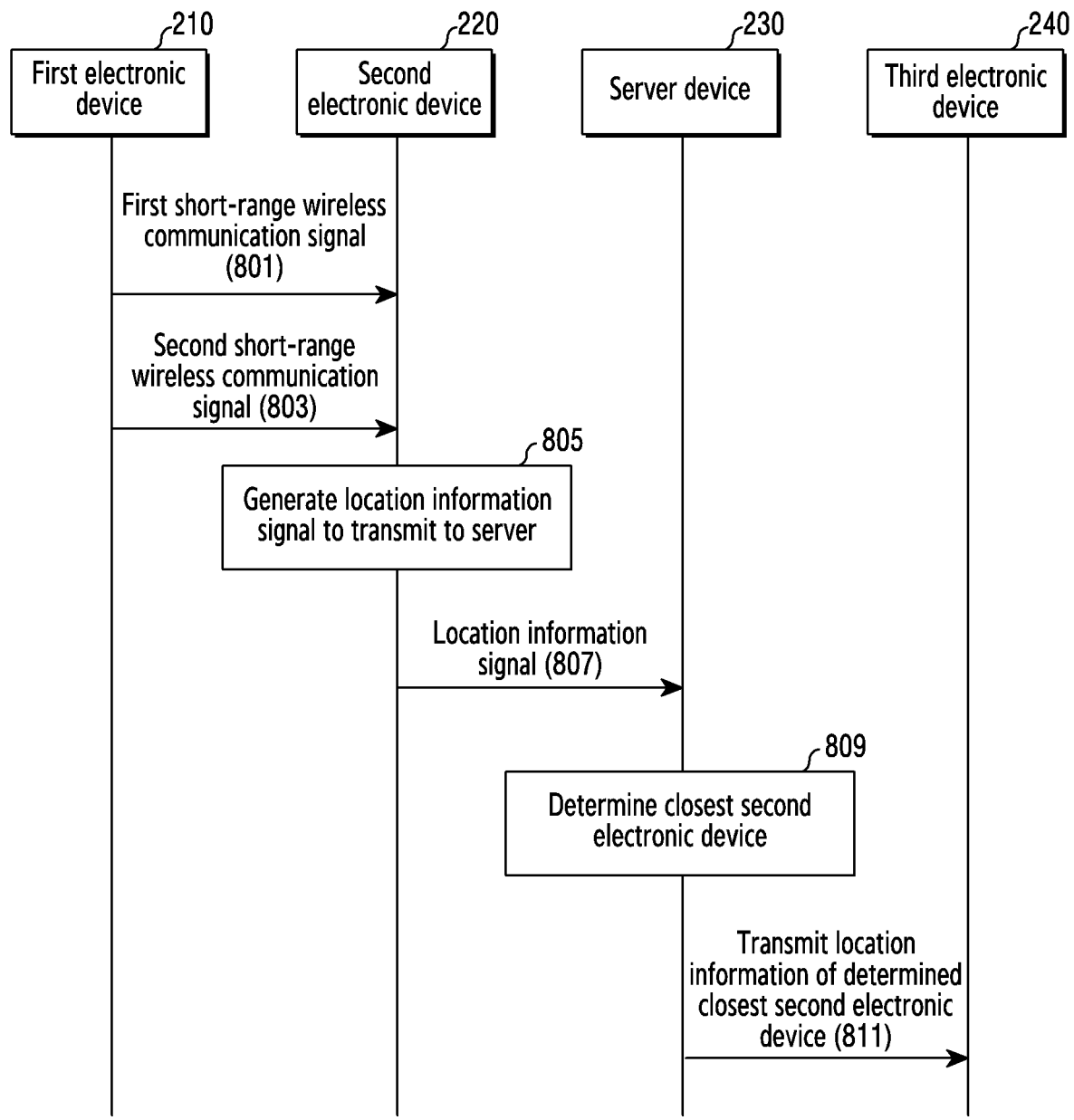
FIG. 8 is a view illustrating signaling and an operation flow of a first electronic device, a second electronic device, a server device, and a third electronic device which are included in a location determining system according to an embodiment of the disclosure.

FIG. 8 illustrate signaling and an operation flow of a first electronic device, a second electronic device, a server device, and a third electronic device which are included in a location determining system according to an embodiment of the disclosure. The first electronic device of FIG. 8 may be a device corresponding to the first electronic device 210. The second electronic device of FIG. 8 may be a device corresponding to the second electronic device 220 (for example, the first neighboring device 221, the second neighboring device 222, the third neighboring device 223). The third electronic device of FIG. 8 may be a device corresponding to the third electronic device 240, the electronic device 101. The server device of FIG. 8 may include the server device 230. Respective operations of the devices illustrated in FIG. 8 may correspond to the operations of the devices explained in FIGS. 4 to 7. Referring to FIG. 8, only one second electronic device 220 is illustrated, but each of the at least one second electronic device (for example, the first neighboring device 221, the second neighboring device 222, the third neighboring device 223) may perform operations according to FIG. 8.

According to an embodiment, in operation 801, the first electronic device 210 may transmit a first short-range wireless communication signal and in operation 803, a second short-range wireless communication signal. Operation 801 may be an operation corresponding to operation 410 of FIG. 4, and/or operation 510 of FIG. 5. Operation 803 may be an action corresponding to operation 420 of FIG. 4, and/or operation 520 of FIG. 5.

According to an embodiment, in operation 805, the second electronic device 220 may generate a location information signal to transmit to the server.

In an embodiment, the second electronic device 220 may generate the location information signal to transmit to the sever, based on first output information included in the first short-range wireless communication signal and second output information included in the second short-range wireless communication signal. Operation 805 may be an operation corresponding to operation 530 of FIG. 5.

According to an embodiment, in operation 807, the second electronic device 220 may transmit the generated location information signal to the server 230. Operation 807 may be an operation corresponding to operation 540 of FIG. 5, and/or operation 610 of FIG. 6.

According to an embodiment, in operation 809, the server device 230 may select one electronic device that is closest to the first electronic device 210 among the at least one second electronic device 220. Operation 809 may be an operation corresponding to operation 620 of FIG. 6.

According to an embodiment, in operation 811, the server device 230 may transmit location information of the selected one second electronic device to the third electronic device 240. Operation 811 may be an operation corresponding to operation 630 of FIG. 6, and/or operation 710 in FIG. 7.

According to an embodiment of the disclosure, a first electronic device may include a communication circuit, and at least one processor electrically connected with the communication circuit, and the at least one processor may transmit a first short-range wireless communication signal of a first output intensity through the communication circuit, and may transmit a second short-range wireless communication signal of a second output intensity through the communication circuit, and the first output intensity and the second output intensity may be different from each other.

In an embodiment, the first short-range wireless communication signal may include first output information regarding an output intensity of the first short-range wireless communication signal, and the second short-range wireless communication signal may include second output information regarding an output intensity of the second short-range wireless communication signal.

In an embodiment, when a battery state of the first electronic device is less than or equal to a threshold value, the second output intensity may have a value larger than the first output intensity, and, when the battery state of the first electronic device is larger than the threshold value, the second output intensity may have a value smaller than the first output intensity.

In an embodiment, the at least one processor may identify a wireless communication link state between the first electronic device and a third electronic device, and may transmit the first short-range wireless communication signal and the second short-range wireless communication signal, based on the wireless communication link state.

In an embodiment, when the wireless communication link state is a connection state, the second output intensity may have a value smaller than the first output intensity.

In an embodiment, when the wireless communication link state is a disconnection state, the at least one processor may identify an elapsed time from a time when the wireless communication link is disconnected, and, when the elapsed time is longer than or equal to a pre-defined time, the second output intensity may have a value larger than the first output intensity.

In an embodiment, the at least one processor may determine a transmission period of a short-range wireless communication signal, based on at least one of a battery state of the first electronic device or a wireless communication link state between the first electronic device and a third electronic device, and may transmit the first short-range wireless communication signal and the second short-range wireless communication signal according to the transmission period.

In an embodiment, when it is identified that the battery state is less than or equal to a threshold value, the at least one processor may determine the transmission period to have a value smaller than a pre-set value, and when it is identified that the battery state exceeds the threshold value, the at least one processor may determine the transmission period to have a value larger than the pre-set value.

In an embodiment, when the wireless communication link state is a connection state, the at least one processor may determine the transmission period to have a value larger than a pre-set value, and when the wireless communication link state is a disconnection state, the at least one processor may determine the transmission period to have a value smaller than the pre-set value.

In an embodiment, the at least one processor may periodically generate identification information of the first electronic device, the first short-range wireless communication signal may include first identification information generated at a first time, and the second short-range wireless communication signal may include second identification information generated at a second time, and the identification information of the first electronic device may include at least one of a Bluetooth® address of the first electronic device, a device identifier, and information regarding a history of connecting with a third electronic device.

According to an embodiment of the disclosure, a second electronic device may include a communication circuit, and at least one processor electrically connected with the communication circuit, and the at least one processor may receive a first short-range wireless communication signal including first output information from a first electronic device, may receive a second short-range wireless communication signal including second output information from the first electronic device, may select a signal that includes a small value among an output intensity of the first short-range wireless communication signal and an output intensity of the second short-range wireless communication signal, may generate a location information signal including output information included in the selected signal, and location information of the second electronic device; and may transmit the location information signal to a server, and the first output information may include information regarding the output intensity of the first short-range wireless communication signal, and the second output information may include information regarding the output intensity of the second short-range wireless communication signal.

In an embodiment, the at least one processor may receive a measurement request signal instructing to measure a distance to the first electronic device from the server, and in response to the measurement request signal being received, the at least one processor may generate a distance measurement result by measuring the distance to the first electronic device, and may transmit the generated distance measurement result to the server.

In an embodiment, the at least one processor may identify a first RSSI value of the first short-range wireless communication signal, and, when it is identified that a difference between the first RSSI value and the output intensity of the first short-range wireless communication signal is less than or equal to a designated value, the at least one processor may select the first short-range wireless communication signal.

In an embodiment, the location information of the second electronic device may include at least one of global positioning system (GPS) information of the second electronic device, information regarding a relative location difference of the first electronic device.

In an embodiment, the second electronic device may further include a display, and a user interface indicating that a signal including the location information is transmitted to the server may be displayed through the display.

According to an embodiment, an operating method of a first electronic device may include: transmitting a first short-range wireless communication signal of a first output intensity; and transmitting a second short-range wireless communication signal of a second output intensity, and the first output intensity and the second output intensity may be different from each other.

In an embodiment, the first short-range wireless communication signal may include first output information regarding an output intensity of the first short-range wireless communication signal, and the second short-range wireless communication signal may include second output information regarding an output intensity of the second short-range wireless communication signal.

In an embodiment, when a battery state of the first electronic device is less than or equal to a threshold value, the second output intensity may have a value larger than the first output intensity, and, when the battery state of the first electronic device is larger than the threshold value, the second output intensity may have a value smaller than the first output intensity.

In an embodiment, the method may include identifying a wireless communication link state between the first electronic device and a third electronic device, and, when the identified wireless communication link state is a connection state, the second output intensity may have a value smaller than the first output intensity. The method may include, when the identified wireless communication link state is a disconnection state, identifying an elapsed time from a time when the wireless communication link is disconnected, and, when the elapsed time is longer than or equal to a predefined time, the second output intensity may have a value larger than the first output intensity.

In an embodiment, the method may include periodically generating identification information of the first electronic device, and first identification information included in the first short-range wireless communication signal, and second identification information included in the second short-range wireless communication signal may be different from each other.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a communication circuit;
at least one processor; and memory storing instructions that, when executed by the at least one processor, cause the electronic device to:
receive, via the communication circuit, a first short-range wireless communication signal comprising first output information from an external electronic device, wherein the first output information includes a first output intensity corresponding to a first output value of the first short-range wireless communication signal when transmitted by the external electronic device;
receive, via the communication circuit, a second short-range wireless communication signal comprising second output information from the external electronic device, wherein the second output information includes a second output intensity corresponding to a second output value of the second short-range wireless communication signal when transmitted by the external electronic device;
select a signal having a smaller intensity from among of the first short-range wireless communication signal and the second short-range wireless communication signal based on the first output information and the second output information;
generate a location information signal comprising output information included in the selected signal, and location information of the electronic device; and
control the communication circuit to transmit the location information signal to a server, wherein the server determines whether the electronic device is closest to the external electronic device based at least on the location information signal.

2. The electronic device of claim 1, wherein the instructions, when executed by the at least one processor, cause the electronic device to:
receive, from the server, a measurement request signal instructing to measure a distance from the electronic device to the external electronic device;
based on the received measurement request signal, generate a distance measurement result by measuring the distance from the electronic device to the external electronic device; and
control the communication circuit to transmit the generated distance measurement result to the server.

3. The electronic device of claim 1, wherein the instructions, when executed by the at least one processor, cause the electronic device to:
identify a first RSSI value of the first short-range wireless communication signal; and based on identifying that a difference between the first RSSI value and the first output intensity of the first short-range wireless communication signal is less than or equal to a reference value, select the first short-range wireless communication signal.

4. The electronic device of claim 1, wherein the location information of the electronic device comprises at least one of global positioning system (GPS) information of the electronic device, or information regarding a relative location of the electronic device with respect to the external electronic device.

5. The electronic device of claim 1, further comprising:
a display configured to display a user interface indicating that the location information signal comprising the location information is transmitted to the server.

* * * * *